W. A. HUNTER.
BRAKE.
APPLICATION FILED NOV. 20, 1912. RENEWED NOV. 18, 1914.
1,144,359.
Patented June 29, 1915.
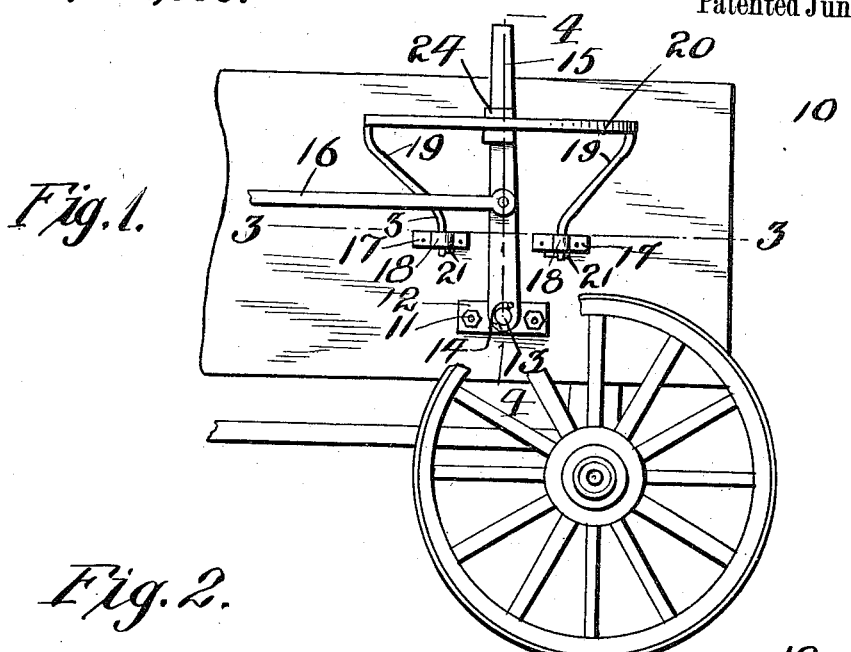
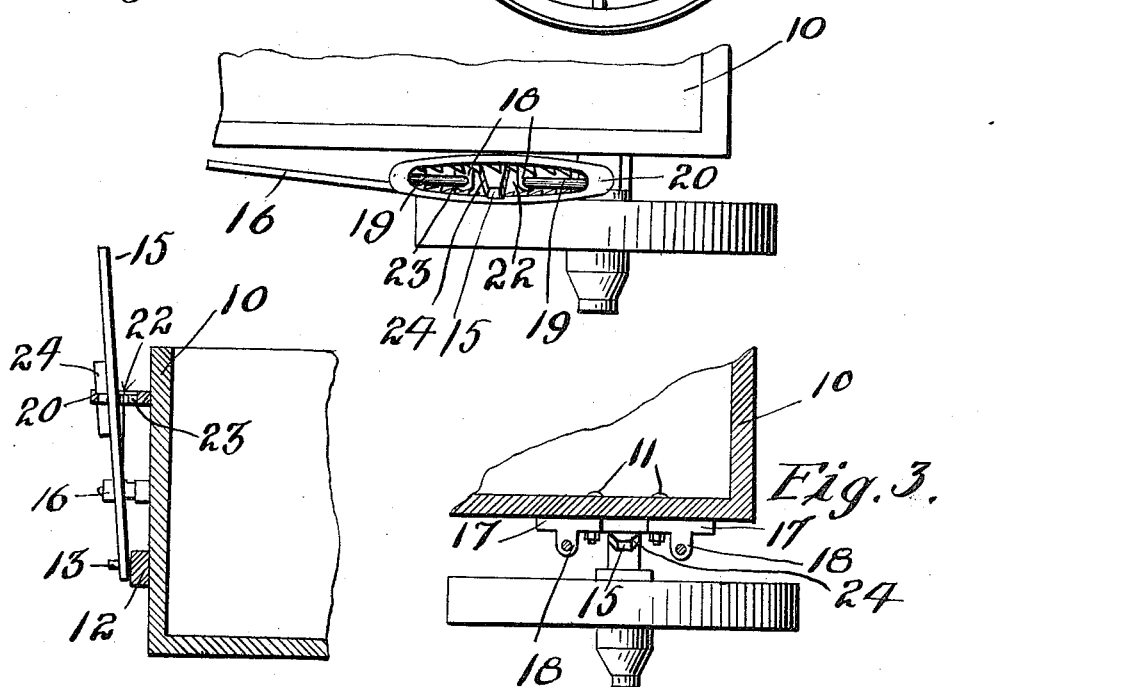
Witnesses
C. Lynch.
Inventor
W. A. Hunter.
by Chamalee Chamalee
Attorneys

UNITED STATES PATENT OFFICE.

WILLIAM A. HUNTER, OF MANKATO, KANSAS.

BRAKE.

1,144,359.  Specification of Letters Patent.  Patented June 29, 1915.

Application filed November 20, 1912, Serial No. 732,480. Renewed November 18, 1914. Serial No. 872,846.

*To all whom it may concern:*

Be it known that I, WILLIAM A. HUNTER, a citizen of the United States, residing at Mankato, in the county of Jewell, State of Kansas, have invented certain new and useful Improvements in Brakes; and I do hereby declare the following to be a full, clear, and exact description of the invention, such as will enable others skilled in the art to which it appertains to make and use the same.

My invention relates to improvements in brakes, and has for its leading object the provision of an improved form of brake particularly adapted for use upon farm wagons or similar vehicles when picking corn or the like.

A further object of my invention is the provision of an improved guide and locking member for the controlling lever for the brake which part may be quickly secured upon either side of the vehicle, as desired, to permit of the operation of the brake from that side of the vehicle on which the person is walking when picking corn, etc.

Another object of my invention is the provision of an improved form of readily reversible combined guide and ratchet locking member for removable attachment to the side of a vehicle which will facilitate the easy locking of the brake lever by a person within the wagon or one walking at the side of the wagon.

Other objects and advantages of my improved brake mechanism will be readily apparent by reference to the following description and with particular reference to the accompanying drawings.

Figure 1 represents a side elevation of the front portion of a wagon equipped with my brake lever and lock. Fig. 2 represents a fragmentary top plan view thereof. Fig. 3 represents a sectional view on the line 3—3 of Fig. 1, and Fig. 4 represents a sectional view on the line 4—4 of said figure.

In the drawings, the numeral 10 designates a farm wagon to which my device is applied.

The ordinary farm wagon, when used to receive the corn as it is picked, is rather inconvenient for the reason that the brake lever is on the right hand side of the wagon and the person picking the corn walks on the left side. It is therefore difficult to operate the handle, and for this reason the present device is formed so that it may be readily applied to the left hand side to be within convenient reach of the picker.

I secure to each side of the wagon near the front end thereof by the bolts 11 a plate 12 which has a central outwardly projecting rounded lug 13. Pivotally mounted upon said lug and retained thereon by the cotter pin 14 passed through the outer end of the lug, is the brake operating lever 15 having pivoted thereto the link 16 the rear end of which is connected in any suitable manner to the brake beam. (Not shown.)

To enable me to lock the lever 15 and thus the brakes in desired position, I secure to each of the sides of the wagon adjacent the plate 12, the pair of brackets 17 which have the offset portions 18 to receive the lower ends of the depending curved arms 19 formed at the ends of the substantially elliptical plate 20.

Cotter pins 21 are passed through the lower ends of the arms below said brackets to secure the arms firmly in place therein. The plate 20 is formed with the central longitudinally extending slot 22 in each side wall of which are formed the inwardly projecting teeth 23, the lever 15 projecting upward through said slot and having the flanged portions or edges 24 for engagement with the teeth which form racks to lock the lever in adjusted position.

From the foregoing description taken in connection with the accompanying drawings, the construction of my improved brake operating mechanism will be readily understood, and it will be seen that on account of the construction of the various parts that by the removal of the cotter pins 14 and 21, the guide plate 20, the lever 15 and link 16 may be removed from the wagon and secured at the other side of the wagon so that the brake may be operated with equal facility at said other side of the wagon.

It will also be noted that the relative positions of the parts are not changed when they are moved to the other side of the wagon box. When on one side of the wagon, one set of teeth is used, while on the other side of the wagon the other set of teeth is used. This obviates the necessity for the complete detachment and reversal of the parts which occurs in devices heretofore.

What I claim is:

A brake for a wagon comprising a brake controlling lever detachably pivoted to the side of the wagon, a bracket secured to the wagon on each side of the brake lever, an elongated plate having depending integral arms removably engaged in said brackets, said plate having a longitudinally extending slot formed therein through which the brake lever projects, the inner side walls of the slots being formed with inwardly projecting teeth for engagement by the brake lever to hold the lever in adjusted position.

In testimony whereof, I affix my signature, in the presence of two witnesses.

WILLIAM A. HUNTER.

Witnesses:
G. O. KIRKPATRICK,
GUY M. ROSE.

Copies of this patent may be obtained for five cents each, by addressing the "Commissioner of Patents, Washington, D. C."